July 1, 1924.
W. AUCHSTETTER
SHIELD FOR VEHICLE HEADLIGHTS
Filed July 12, 1923
1,499,961
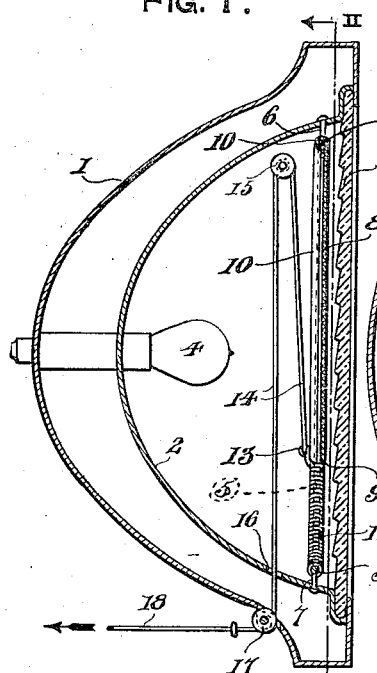
FIG. 1.
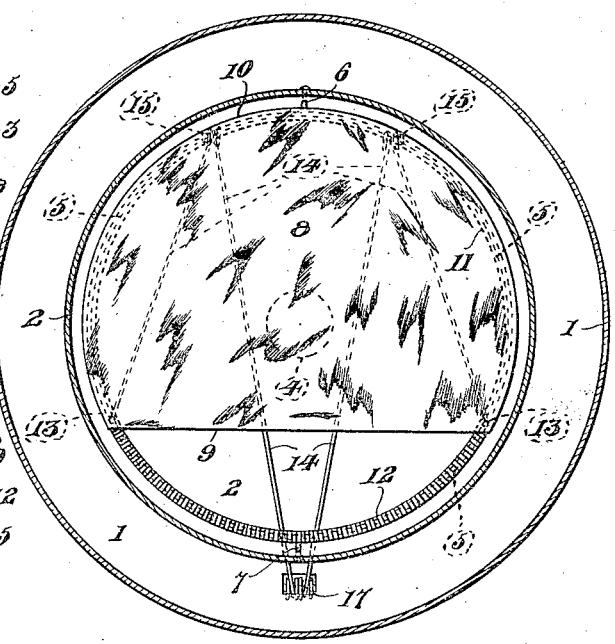
FIG. 2.
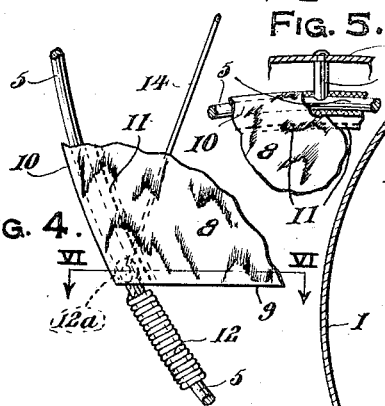
FIG. 5.
FIG. 4.
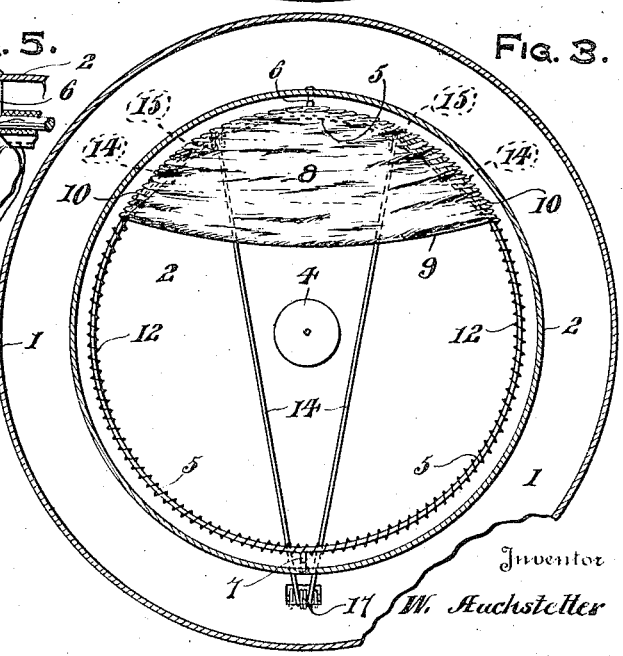
FIG. 3.
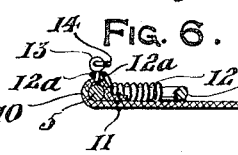
FIG. 6.
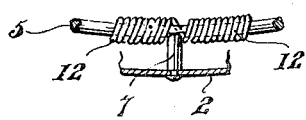
FIG. 7.

Patented July 1, 1924.

1,499,961

UNITED STATES PATENT OFFICE.

WILLIAM AUCHSTETTER, OF IDA GROVE, IOWA.

SHIELD FOR VEHICLE HEADLIGHTS.

Application filed July 12, 1923. Serial No. 651,045.

*To all whom it may concern:*

Be it known that I, WILLIAM AUCHSTETTER, a citizen of the United States of America, residing at Ida Grove, in the county of Ida and State of Iowa, have invented certain new and useful Improvements in Shields for Vehicle Headlights, of which the following is a specification.

This invention relates to certain new and useful improvements in shields for vehicle headlights and particularly to the type wherein a shield that is adjustable or movably supported within the casing of a headlight is operable for exposing a greater or less area of the lens of the casing for controlling the projection of light rays passing through the lens.

The primary object of the invention is to provide a shield for headlights in the form of a flexible curtain of an area greater than a semi-circle when fully extended, normally covering the front lens of the casing at the upper side thereof and projecting below the horizontal diametrical line thereof and further traversing the longitudinal axis of the illuminating means to shut off part of the light rays and reduce glare from the headlights.

A further object of the invention is to provide a shield for headlights, of the type above set forth wherein spring devices are associated with the shield for normally holding the same in an extended operative position and having manually operable means associated with the shield and spring devices for retracting or raising the shield to expose greater portions of the front lens and interior of the headlight casing.

With the above and other objects in view as the nature of the invention is better understood, the same consists of the novel form, combination and arrangement of parts hereinafter more fully described, shown in the accompanying drawing and claimed.

In the drawing, wherein like reference characters designate corresponding parts throughout the several views, Figure 1 is a vertical longitudinal sectional view of a vehicle headlight constructed in accordance with the present invention, showing the flexible shield or curtain disposed within the headlight casing to control the projection of light rays through the front lamp, Figure 2 is a vertical sectional view taken on line II—II of Fig. 1 showing the shield or curtain in its fully extended position of substantially circular formation with the lower end thereof cut away upon a horizontal chordal line, Figure 3 is a sectional view, similar to Fig. 2 showing the curtain in its raised or retracted position and against the tension of the spring device associated therewith, Figure 4 is a fragmentary front elevational view of the curtain and supporting ring therefor, Figure 5 is a detail sectional view showing the curtain supporting ring secured at its upper side to the reflecting wall of the lamp casing, Figure 6 is a detail sectional view taken on line VI—VI of Fig. 4 showing the shirring loop at the curved edge of the curtain inclosing the supporting ring therefor, and Figure 7 is a detail sectional view showing the mounting for the lower side of the ring and the anchoring means for the coil spring inclosing the ring.

Referring more in detail to the accompanying drawing, there is illustrated a shield for vehicle headlights, the headlights including an outer casing 1 having an inner reflecting wall 2 with a front lens 3 supported at the forward end of the casing while an electric bulb 4 is supported centrally of the casing and reflecting wall as shown in Fig. 1.

The shield associated with the headlight is positioned within the casing and reflecting wall 2, the ring 5 being supported at its upper side by the pin 6 anchored in the upper side of the reflecting wall 2, while the lower side of the ring 5 is supported by the pin 7 anchored in the lower side of the reflecting wall. The shield is in the form of a curtain 8, substantially circular in form and being cut upon a horizontal chordal line 9 at its lower side, the curved edge of the curtain 8 being folded upon itself to provide a shirring loop 10 by stitching as at 11, shown more clearly in Fig. 6. The upper supporting pin 6 for the ring 5 passes through the shirring loop 10 and prevents accidental shifting movements of the curtain upon the supporting ring 5.

To retain the curtain 8 in a normally stretched and taut condition as illustrated in Figs. 1 and 2, there is provided a coil spring 12 that incloses the lower exposed section of the supporting ring 5, the convolutions of the spring intermediate the ends thereof being separated and so retained by the lower supporting pin 7 for the ring to prevent shifting movement of the spring upon the ring. As shown in Fig. 6, a pin 13 is secured to opposite side edges of the curtain at the looped portions 10 thereof and at the ends of the chordal line 9 with the end 12<sup>a</sup> of the spring secured to adjacent pins 13. It will therefore be seen that when the spring 12 is fully contracted, the curtain 8 is extended and so retained in a taut condition.

The operating means for shifting the curtain to expose a greater area of the lens 3 and the lamp 4 includes a flexible cable 14 attached to each pin 13 and passing over a pulley 15 supported upon the inner face of the reflecting wall 2, the two operating cables 14 thence passing downwardly through openings 16 in the lower side of the reflecting wall for passage over a double pulley construction 17 for attachment to a single operating cable 18, the operating end of the cable 18 being conveniently positioned, such as upon the instrument board or adjacent the steering wheel of a motor vehicle.

The normal position of the curtain 8 is shown in Figs. 1 and 2, the same extending substantially over the major portion of the front lens 3, being positioned forwardly of the lamp 4 and leaving only a small exposed area at the lower side of the lamp casing for the projection of light rays, the curtain 8 eliminating the glare. Upon pulling the operating cable 18, the flexible cables 14 passing over the pulleys 15 and 17 and attached to the ends of the spring 12 and the lower side edges of the curtain 8, cause the curtain to be raised against the tension of the spring 12 as illustrated in Fig. 3, exposing a greater area of the lens 3 and the lamp 4 positioned centrally of the casing. When the cable 18 is released, the side sections of the spring 12 will be restored to their retracted positions, drawing the looped edges 10 of the curtain over the supporting ring 5 and again stretching the curtain to a taut condition for shielding the lamp 4.

While there is herein shown and described the preferred embodiment of the present invention, it is nevertheless to be understood that minor changes may be made therein without departing from the spirit and scope of the invention as claimed.

What is claimed as new is:—

1. In a vehicle headlight of the type described, a lamp casing carrying a front lens, a curtain within the casing adjacent the lens and extending from the upper end thereof downwardly to a point adjacent the lower end leaving a portion of the casing exposed for the projection of light rays, means for holding the curtain in a taut condition, and means for raising the curtain, said curtain holding means including a circular frame, said curtain embodying a circular pocket edge enclosing a portion of the frame and a chordal lower edge.

2. In a vehicle headlight of the type described, a lamp casing carrying a front lens, a curtain within the casing adjacent the lens and extending from the upper end thereof downwardly to a point adjacent the lower end leaving a portion of the casing exposed for the projection of light rays, means for holding the curtain in a taut condition, means for raising the curtain, said curtain holding means including a circular frame, said curtain embodying a circular pocket edge enclosing a portion of the frame and a chordal lower edge, a coil spring enclosing the normally exposed portion of the circular frame with the outer ends of the chordal edge of the curtain secured to the ends of the spring, and operating cables connected to the ends of the springs for raising the curtain against spring tension thereon.

3. In a vehicle headlight of the type described, a lamp casing carrying a front lens, a curtain within the casing adjacent the lens and extending from the upper end thereof downwardly to a point adjacent the lower end leaving a portion of the casing exposed for the projection of light rays, means for holding the curtain in a taut condition, means for raising the curtain, said curtain holding means including a circular frame, said curtain embodying a circular pocket edge enclosing a portion of the frame and a chordal lower edge, a coil spring enclosing the normally exposed portion of the circular frame with the outer ends of the chordal edge of the curtain secured to the ends of the spring, a cable attached to the ends of the spring, guide pulleys over which the cables pass outwardly of the casing, and a single pull cable for the two cables attached to the spring.

4. In a vehicle headlight of the type described, a lamp casing carrying a front lens, a flexible curtain within the casing adjacent the lens and of a form when extended to overlie the major portion of the lens, spring means for normally holding the curtain in an extended taut condition and manually operable means for shifting the curtain against the spring tension thereon to expose a greater area of the lens, the mounting for the curtain including a ring within the casing and said spring means for the curtain being supported on the ring and attached to the curtain.

5. In a vehicle headlight of the type described, a lamp casing carrying a front lens, a flexible curtain within the casing adjacent the lens and of a form when extended to overlie the major portion of the lens, spring means for normally holding the curtain in an extended taut condition, manual means for shifting the curtain against the spring tension thereon to expose a greater area of the lens, means for guiding the movement of the curtain and spring tension means, said last mentioned means including an annular ring, and means for performing the combined function of retaining said ring in spaced relation to the lamp casing and for preventing improper shifting of the curtain and spring tension means in respect to said guiding means.

In testimony whereof I affix my signature.

WILLIAM AUCHSTETTER.